US006771634B1

(12) United States Patent
Wright

(10) Patent No.: US 6,771,634 B1
(45) Date of Patent: *Aug. 3, 2004

(54) REGISTRATION OF MOBILE PACKET DATA TERMINALS AFTER DISASTER

(75) Inventor: Andrew S. Wright, Vancouver (CA)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/289,362

(22) Filed: Apr. 9, 1999

Related U.S. Application Data

(62) Division of application No. 08/662,716, filed on Jun. 10, 1996, now Pat. No. 6,157,633.

(51) Int. Cl.[7] .............................................. H04J 3/24
(52) U.S. Cl. ........................................ 370/349; 370/447
(58) Field of Search ................................. 370/277, 278, 370/346, 347, 348, 349, 444, 445, 458, 461, 462, 447, 328, 329, 337; 445/435, 432, 466

(56) References Cited

U.S. PATENT DOCUMENTS

| | | | |
|---|---|---|---|
| 4,737,978 A | 4/1988 | Burke et al. | 455/438 |
| 4,833,702 A | 5/1989 | Shitara et al. | 455/465 |
| 5,008,883 A | 4/1991 | Eizenhofer et al. | |
| 5,058,002 A | * 10/1991 | Nakamura et al. | 707/1 |
| 5,097,499 A | 3/1992 | Cosentino | 370/348 |
| 5,237,570 A | 8/1993 | Smolinske et al. | 370/348 |
| 5,276,703 A | 1/1994 | Budin et al. | 375/130 |
| 5,297,142 A | 3/1994 | Paggeot et al. | 370/461 |
| 5,301,357 A | 4/1994 | Thompson | 455/435 |
| 5,434,847 A | 7/1995 | Kou | 370/252 |
| 5,461,627 A | 10/1995 | Rypinski | 370/346 |
| 5,467,381 A | 11/1995 | Peltonen et al. | 455/432 |
| 5,521,925 A | 5/1996 | Merakos et al. | 370/337 |
| 5,574,863 A | * 11/1996 | Nelson et al. | 710/100 |
| 5,588,043 A | 12/1996 | Tiedemann et al. | 455/435 |
| 5,949,769 A | * 9/1999 | Davidson et al. | 370/329 |

FOREIGN PATENT DOCUMENTS

EP    0 472 349 A2    2/1992

OTHER PUBLICATIONS

Dolev S. et al., "Modified Tree Structure for Location Management in Mobile Environments", *IEEE*, 1995, pp. 4d.4.1–4d.4.8.
Appleby, M.S. and Garrett J., "The Cellnet Cellular Radio Network, Part 1–General System Overview", *British Telecommunications Engineering*, vol. 4, Jul. 1985, pp. 62–69.

* cited by examiner

Primary Examiner—Chau Nguyen
Assistant Examiner—Soon-Dong Hyun
(74) Attorney, Agent, or Firm—Perkins Coie LLP

(57) ABSTRACT

Registration attempts by a terminal using a contention protocol to communicate with a central system are controlled by transmitting a registration index from the central system to the terminal at specified temporal periods, and modifying the value of the registration index when the terminal should attempt to register with the central system. A mode flag is transmitted from the central system to the terminal at predetermined temporal intervals, and the value of the mode flag is modified when the central system is recovering from a disaster so that the terminal refrains from immediately attempting to register with the central system. During disaster recovery, the terminal is able to associate itself with one of a plurality of sub-intervals. The central system transmits a sub-interval designator to the terminal at regular temporal periods during disaster recovery. The central system modifies the value of the sub-interval designator after a predetermined number of the regular temporal periods. The flow of registration attempts by a community of terminals is smoothed from a situation wherein essentially the entire community of terminals is contending to register after a disaster to a situation wherein subsets of the community try to register in respective sub-intervals after the disaster.

29 Claims, 5 Drawing Sheets

REGISTRATION OF MOBILE PACKET DATA TERMINALS AFTER DISASTER

This is a division of application Ser. No. 08/662,716, filed Jun. 10, 1996, now U.S. Pat. No. 6,157,633.

BACKGROUND OF THE INVENTION

The present invention relates to a wireless packet data communication system having a central system and mobile terminals, and in particular, to recovering from a disaster at the central system.

In a communications system having a central system and addressable mobile terminals, there is a forward or downstream channel and a reverse or upstream channel.

On the downstream channel, the central system broadcasts information accessible to, sometimes referred to as heard by, all of the mobile terminals. The downstream broadcast comprises system control messages including control messages at predetermined time intervals and packets of message data respectively addressed to a single mobile terminal (or group of terminals sharing a common address). The downstream broadcast is essentially continuous. The downstream channel may comprise several frequencies, and the central system may use one frequency for its transmission, or may hop among frequencies.

On the upstream channel, the mobile terminals respectively transmit packets of message and system-related data to the central system using a contention protocol wherein if packets collide, retransmission is attempted after an essentially random time interval. The mobile terminals directly communicate only with the central system, not with each other. The upstream channel may comprise several frequencies, and a mobile terminal may use one frequency for its transmission, or may hop among frequencies.

The communications system is designed so that the central system is aware of each mobile terminal able to communicate therewith. When a new mobile terminal enters the geographic area served by the central system, which occurs from time to time, the mobile terminal must register with the central system.

Registration commences when a mobile terminal sends, via the upstream channel, its public identity number to the central system along with a request for a temporary identifier. The public identity number and the request for a temporary identifier are examples of system related data. The central system responds by sending, via the downstream channel, a temporary identifier, which is a randomly chosen number in a predetermined range which has not previously been assigned to any other mobile terminals in communications range of the central system, to the requesting mobile terminal. The temporary identifier is an example of a system control message which is sent as needed, that is, not at a regular interval.

During registration, the central system adds to its routing table an entry comprising the external address of the mobile terminal and the temporary identifier assigned to the mobile terminal. The routing table may also include an upstream frequency for the mobile terminal. It will be appreciated that the routing table changes frequently due to the mobility of the terminals. Since the routing table is stored in one place, the central system is vulnerable to loss of the routing table. The central system uses the temporary identifier as the address for the mobile terminal in subsequent downstream message data packets. The temporary identifier is preferred to other preexisting identifiers for security and management reasons.

The requesting mobile terminal and the central system then exchange encryption information. After secure communications are established, the mobile terminal sends its secret identity number to the central system. The central system uses the secret identity number to access a stored profile for the mobile terminal containing various subscriber information, including billing information.

The stored profile for the mobile terminal also contains an external address for a subscriber associated with the mobile terminal. The public identity number of the mobile terminal may be its external address. From time to time, external systems send message data packets having the external address of the mobile terminal to the central system, which uses the external address and its stored routing table to obtain the temporary identifier of the mobile terminal. The central system then transmits the message data packets on the downstream channel with the temporary identifier as destination address. The mobile terminal captures and processes data packets addressed to its temporary identifier.

If a problem occurs at the central system, such as loss of its routing table, which affects the essentially continuous transmission on the downstream channel, some mobile terminals may interpret such problem as an error condition and attempt to register anew with the central system. As these mobile terminals attempt to register anew, the throughput of the upstream channel will be reduced, which may cause further problems at the central system. Yet more mobile terminals will perceive an error condition. Eventually, essentially the entire population of mobile terminals will be in contention for the upstream channel while attempting to register anew, so the throughput of the upstream channel will be degraded to a very low value. Consequently, re-registration will take an inordinately long time, and the message data packet throughput of the communications system during such re-registration will become unacceptably low.

Thus, there is a need for a way to register essentially the entire population of terminals, that is, reconstruct the central system's routing table of temporary identifiers, after a disaster at the central system which has obliterated its routing table.

SUMMARY OF THE INVENTION

In accordance with the present disclosure, registration attempts by a terminal using a contention protocol to communicate with a central system are controlled by transmitting a registration index from the central system to the terminal at specified temporal periods, and modifying the value of the registration index when the terminal should attempt to register with the central system. Use of the registration index prevents unnecessary registration attempts by the terminal.

A mode flag is transmitted from the central system to the terminal at predetermined temporal intervals, and the value of the mode flag is modified when the central system is recovering from a disaster so that the terminal refrains from immediately attempting to register with the central system during disaster recovery.

During disaster recovery, the terminal is able to associate itself with one of a plurality of sub-intervals. The central system transmits a sub-interval designator to the terminal at regular temporal periods during disaster recovery. The central system modifies the value of the sub-interval designator after a predetermined number of the regular temporal periods. The flow of registration attempts by a community of terminals is smoothed from a situation wherein essentially the entire community of terminals is contending to register after a disaster to a situation wherein subsets of the community try to register in respective sub-intervals after the disaster.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 5A and 5B are timing charts illustrating traffic on the downstream channel; and FIGS. 6A and 6B are timing charts illustrating traffic on the upstream channel.

DETAILED DESCRIPTION

Figure 1:
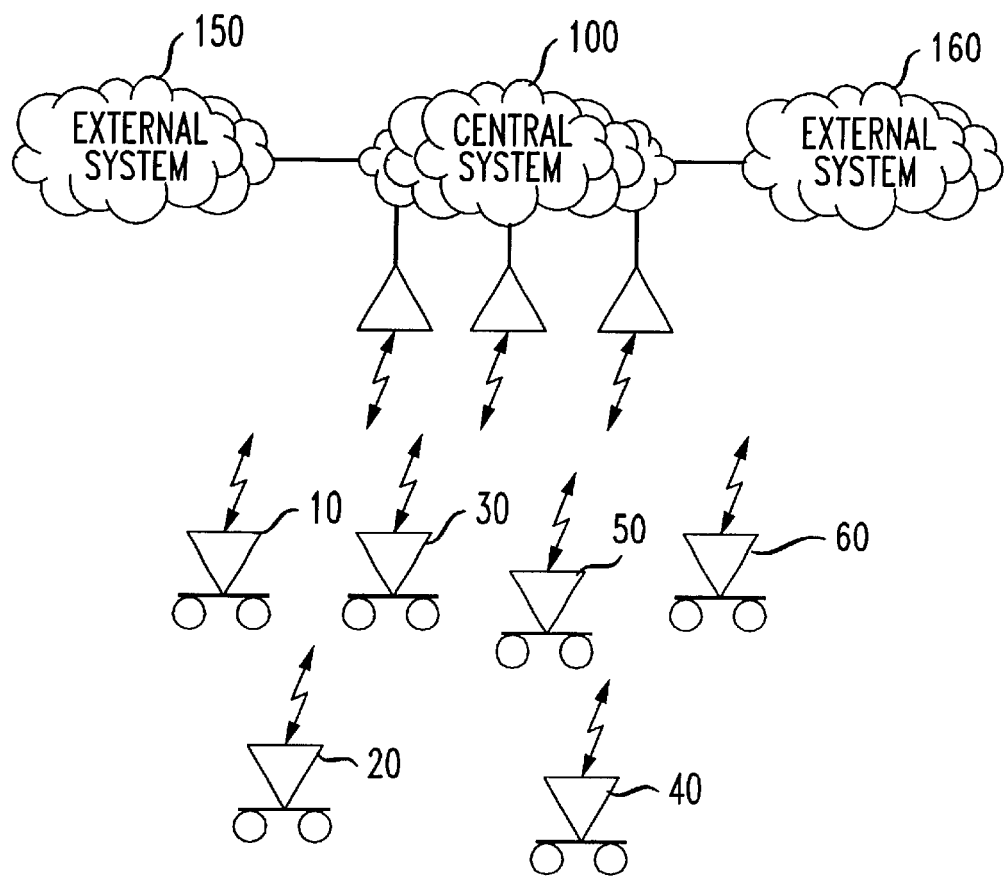
FIG. 1 is a diagram of the environment in which the present invention is applied.

FIG. 1 illustrates an environment having mobile terminals 10–60 in wireless communication with central system 100, which is accessible to external systems 150, 160 via conventional communications techniques. The central system includes a general purpose processor, memory, storage and other conventional data processing facilities. Each mobile terminal includes a processor, memory and storage, not shown or further described as the particular components are not critical to the present invention.

Figure 2:
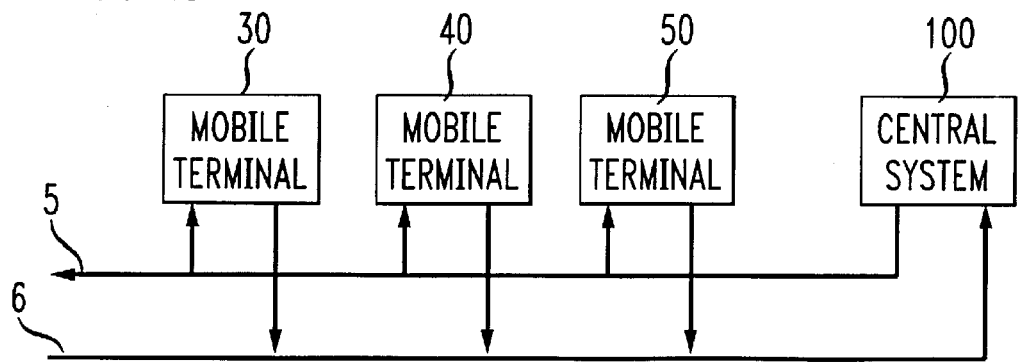
FIG. 2 is a diagram of the communication channels between the central system and mobile terminals.

As shown in FIG. 2, central system 100 sends information to mobile terminals 30–50 via downstream channel 5, while the mobile terminals 30–50 send information to central system 100 via upstream channel 6. Mobile terminals 10, 20 and 60 communicate with central system 100 in similar manner, and are not shown to simplify the drawing in FIG. 2.

According to the present technique, a mobile terminal has a definite way to determine whether it should register with the central system after what may be a disaster. For instances where registration is appropriate, the mobile terminal has a procedure by which it can determine when it should register.

The system control messages broadcast at regular intervals by the central system 100 on the downstream channel are augmented to include a registration index and a mode flag.

The registration index indicates a period of validity for temporary identifiers, that is, a sort of batch number. When the central system routing table is unusable, also referred to as lost, the registration index is incremented. Typically, the registration index is a few bits long to ensure that even if a sequence of system failures are clustered, the registration process is fully performed after the last system failure. In contrast, if the registration index is only one bit long, then it has the same value after a cluster of two failures in which the routing table is lost, and a mobile terminal is not aware that its temporary identifier is invalid. All valid temporary identifiers have the same registration index.

The mode flag indicates whether registration for a community of mobile terminals sharing a central system, also referred to as central system disaster recovery, is in progress.

Figure 3:
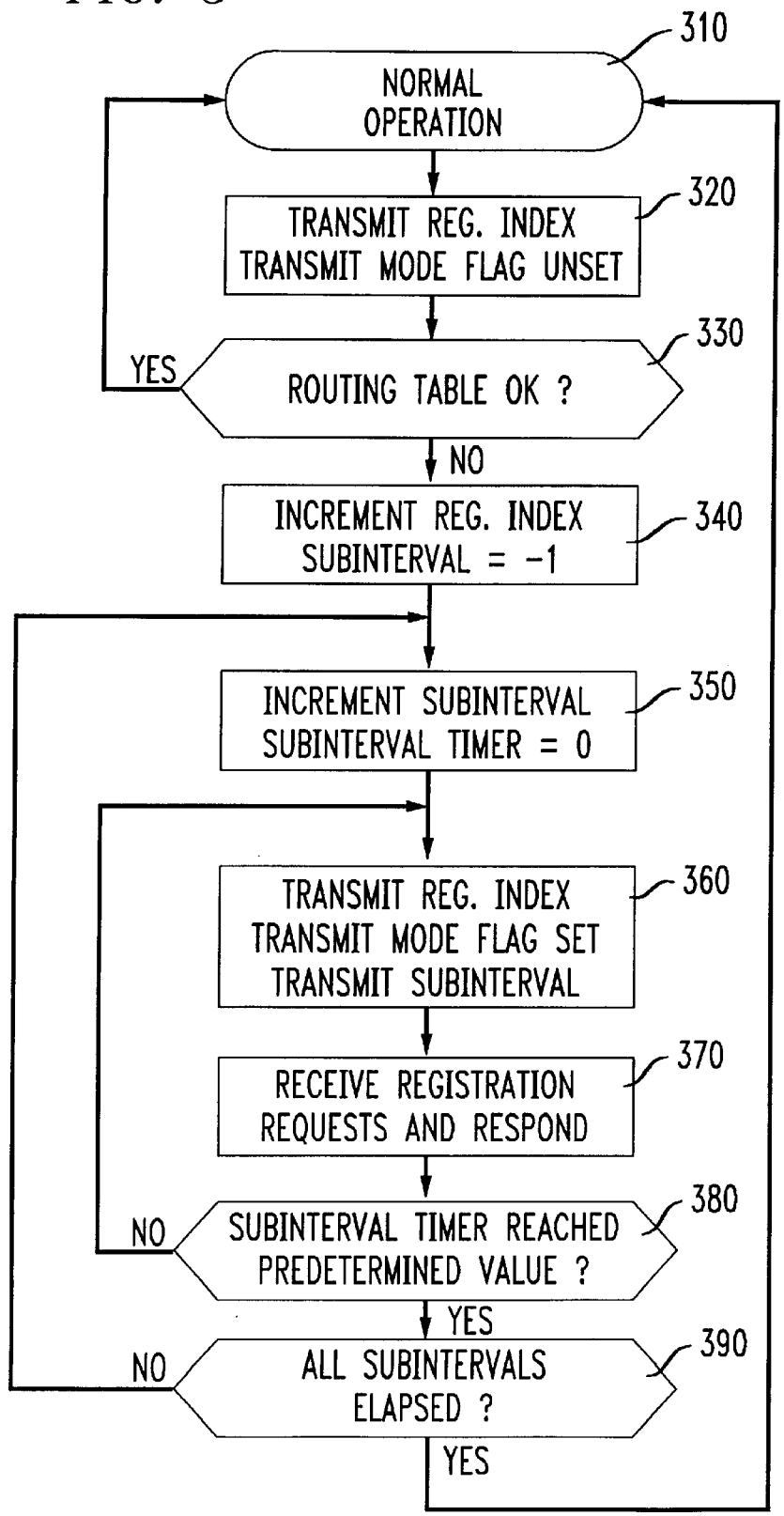
FIG. 3 is a flowchart of actions at the central system.
Figure 4:
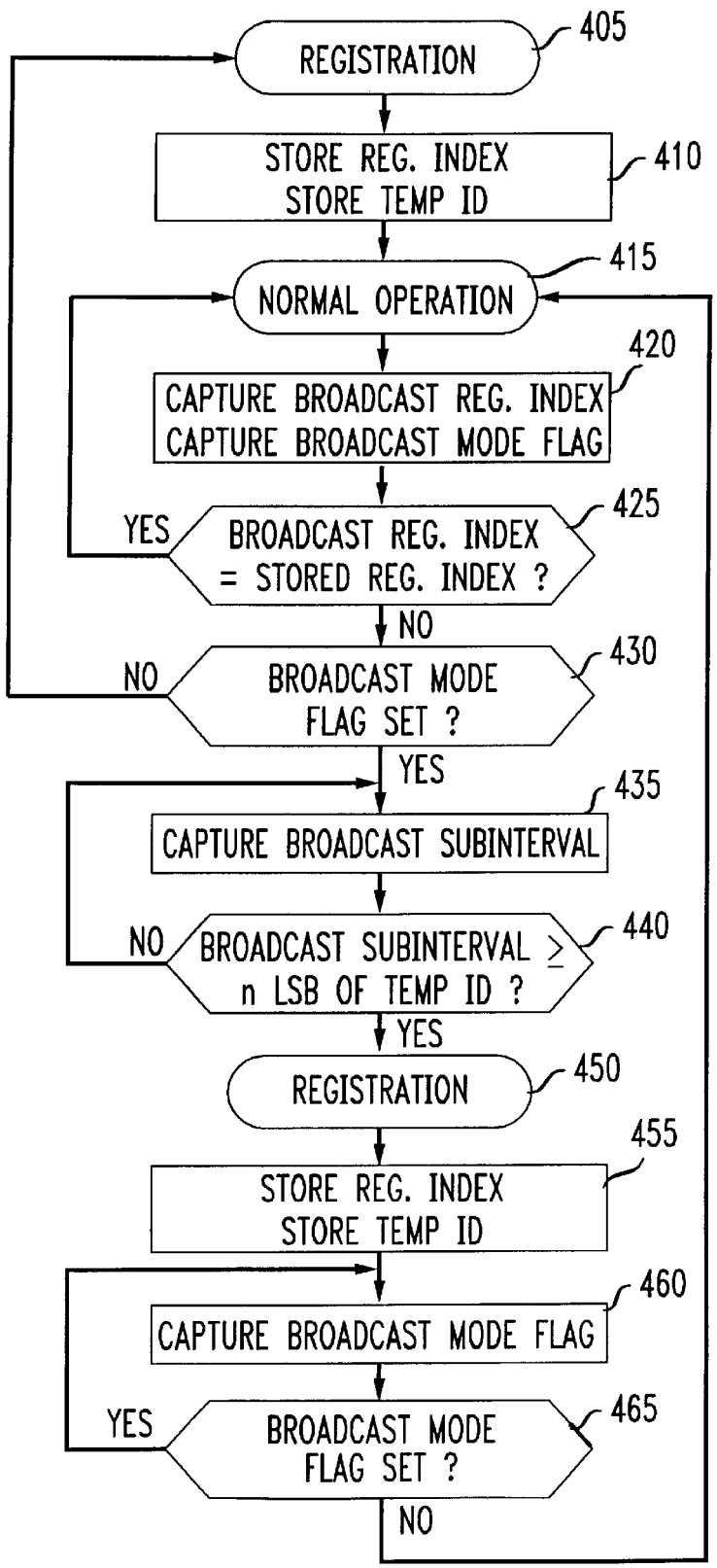
FIG. 4 is a flowchart of actions at a mobile terminal.

FIG. 3 is a flowchart depicting actions at central system 100. FIG. 4 is a flowchart depicting actions at, for example, mobile terminal 10. FIGS. 5A, 5B, 6A, 6B are charts depicting traffic on the downstream and upstream channels for a specific example of the present disaster recovery registration scheme.

At step 310, central system 100 is assumed to be in normal operation, in accordance with the functions of a mobile data intermediate system (MDIS) described in *Cellular Digital Packet Data System Specification*, Release 1.0, Jul. 19, 1993, and Release 1.1, Jan. 19, 1995, available from CDPD Industry Input Coordinator, 650 Town Center Drive, Suite 820, Costa Mesa, Calif. 92626, which are incorporated herein by reference.

Figures 5A, 6A:
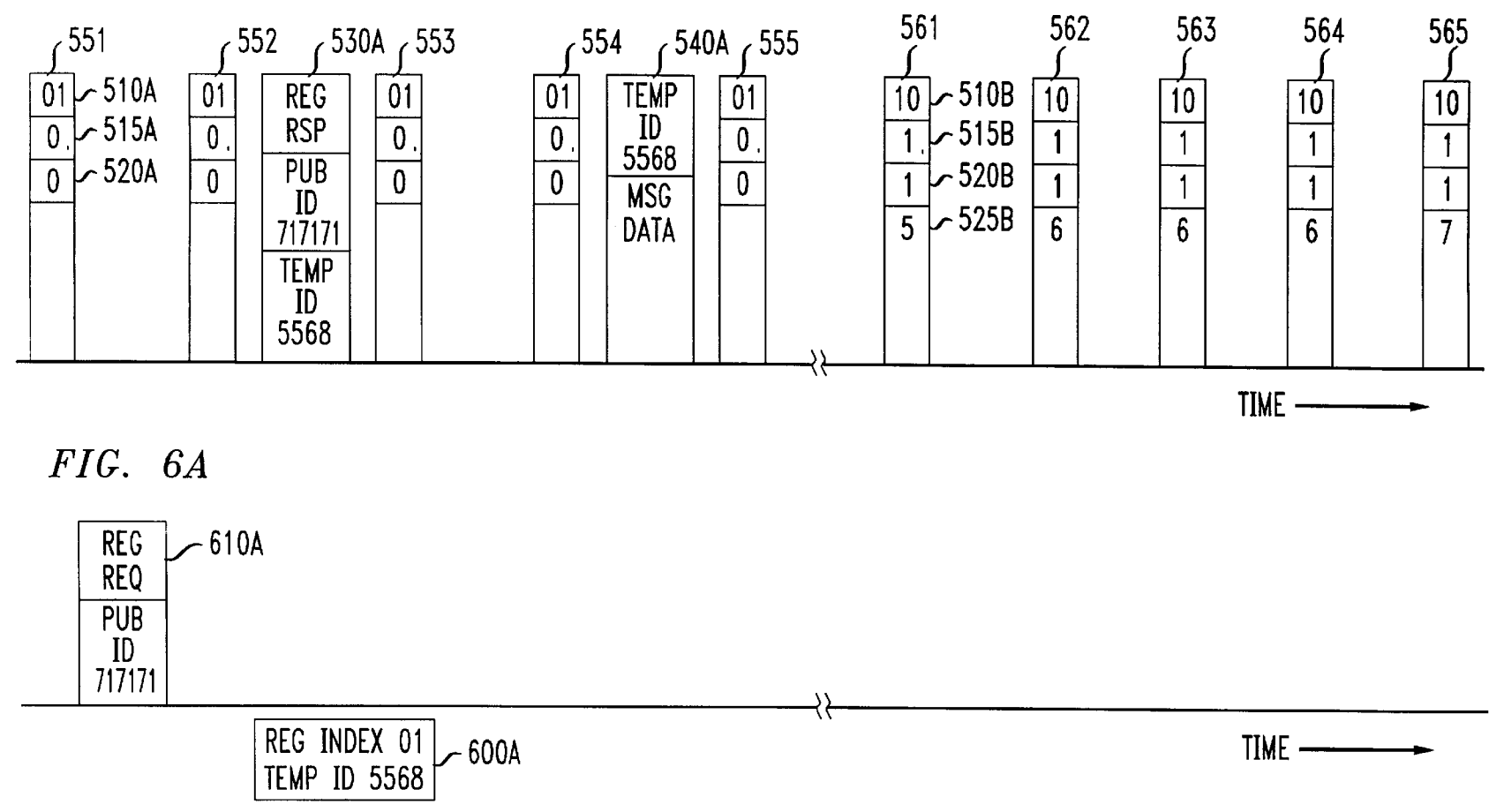

Central system 100 broadcasts, that is, transmits on downstream channel 5, system control messages at regular intervals. FIG. 5A shows regularly broadcast system control messages 551–555; system control message 555 is seen to include registration index 510A, illustrated as being of length two bits and having a value of "01", and mode flag 515A, illustrated as being of length one bit and having a value of "0" corresponding to being unset. At step 320 of FIG. 3, central system 100 broadcasts the registration index and the mode flag, such as registration index 510A and mode flag 515A.

At step 330, central system 100 determines whether its routing table is properly available; if so, central system 100 returns to normal operation 310.

Let it be assumed that mobile terminal 10 generally operates in accordance with the functions of a mobile end system as described in *Cellular Digital Packet Data System Specification*.

Mobile terminal 10 enters the communications area of central system 100, and, at step 405 of FIG. 4, registers with central system 100. As shown in FIG. 6A, registration commences with mobile terminal 10 sending a registration request 610A, including its public identity number, herein "717171", to central system 100 via upstream channel 6. Central system 100 replies to the registration request 610A by sending registration response 530A, including a temporary identifier, herein "5568", to mobile terminal 10 via downstream channel 5. At step 410 of FIG. 4, mobile terminal 10 stores the temporary identifier "5568" and the registration index at the time of receipt of the temporary identifier. From FIG. 5A, the registration index in broadcast message 552 is seen to have a value of "01". Box 600A in FIG. 6A indicates a portion of the storage of the mobile terminal 10.

After registration is complete, at step 415 of FIG. 4, mobile terminal 10 enters normal operation. For example, if external system 150 wishes to send a message to mobile terminal 10 during normal operation (central system 100 in step 310 of FIG. 3 and mobile terminal 10 in step 415 of FIG. 4), central system 100 receives the message from external system 150, and places the message into one or more message data packets, shown as message data packet 540A in FIG. 5A. Meanwhile, mobile terminal 10 listens to the packets broadcast on downstream channel 6, recognizes its temporary identifier "5568" in message data packet 540A, captures the message data packet 540A, and processes it.

At step 420 of FIG. 4, mobile terminal 10 captures the broadcast registration index and mode flag in each of broadcast system control messages 553–555. Since, at step 425, mobile terminal 10 determines that the broadcast registration index value "01" matches the stored registration index value "01", mobile terminal 10 returns to normal operation 415.

Even if traffic on downstream channel 5 was interrupted during this time, mobile terminal 10 does not attempt to register again because the broadcast and stored registration indices match. Use of the registration index is seen to prevent unnecessary registration.

Let it be assumed that a disaster has occurred at central system 100, so that at step 330 of FIG. 3, the routing table is found to be unusable. Central system 100 now proceeds to a disaster recovery procedure according to the present disaster recovery technique. During disaster recovery, the central system suspends normal message data packet transmission, and uses the downstream channel to transmit a sub-interval designator and to register mobile terminals. The sub-interval designator controls the number of mobile terminals allowed to attempt registration at any time.

Let it be assumed that the community of mobile terminals is unknown, and that each mobile terminal has a stored but no longer valid temporary identifier. It will be appreciated that using only the least significant bit (LSB) of the invalid temporary identifier divides the mobile terminal community into two groups, the (LSB=0) group and the (LSB=1) group. Similarly, using the n least significant bits of the invalid temporary identifier divides the mobile terminal community into $2^n$ groups of essentially equal size, whether the temporary identifiers were assigned randomly or sequentially.

Instead of using its temporary identifier, each mobile terminal use a random number, or a different pre-stored number which is statistically evenly distributed over the community of mobile terminals. Instead of using the least significant bits of its invalid temporary identifier, each mobile terminal could use the most significant bits; however, if temporary identifiers are assigned sequentially, the most significant bits will not have an even statistical distribution and so will not ensure that each group is of essentially equal size.

Let the registration interval be divided into $2^n$ sub-intervals. During the first sub-interval, only the mobile terminals in the first group of the $2^n$ groups of mobile terminals are permitted to attempt registration. During the second sub-interval, the mobile terminals in the second group and the as-yet unregistered mobile terminals in the first group are permitted to attempt registration. During the third sub-interval, the mobile terminals in the third group and the as-yet unregistered mobile terminals in the second and first groups are permitted to attempt registration. This procedure continues, so that during the last sub-interval, all of the as-yet unregistered mobile terminals are permitted to attempt registration.

It will be appreciated that n and the temporal length of the sub-interval are matters of design choice. For example, as n increases, the number of mobile terminals trying to register in a sub-interval decreases, so the efficiency of the upstream channel increases. It is important to appreciate that the number of mobile terminals trying to register during a sub-interval decreases with time, as a portion thereof become successfully registered. The sub-interval designator functions as a blind address, in that it selects an individually unknown but statistically manageable number of mobile terminals. Use of the sub-interval designator controls the registration flow of mobile terminals.

More specifically, the length of a sub-interval is chosen depending on the contention protocol and the expected number of mobile terminals being served. Examples of contention protocols are slotted ALOHA, carrier sense multiple access with collision detection (CSMA/CD), digital sense multiple access with collision detection (DSMA/CD). Important characteristics of the contention protocol include number of retries after a failed transmission, wait time before retrying, and so on.

At step 340, central system 100 increments the registration index, for example, from "01" to "10" (base 2 addition) and sets the sub-interval to "–1". At step 350, central system 100 increments the sub-interval to "0" and sets a sub-interval timer to zero. At step 360, central system 100 transmits the new registration index "10", transmits the mode flag in a set condition, such as having a value of "1", and transmits the sub-interval "0".

For purposes of this example, assume that only the least significant digit (base 10) of the temporary identifier is used, so that there are ten sub-intervals. In other words, one-tenth of the mobile terminals will be permitted to register during each sub-interval, plus as yet unregistered mobile terminals, if any, from previous sub-intervals. At step 370, central system 100 receives and responds to registration requests from mobile terminals having a stored invalid temporary identifier with a least significant digit of "0". At regular intervals, central system 100 checks whether the sub-interval has been in progress for long enough, as shown at step 380. If the sub-interval has not reached its predetermined temporal duration, then steps 360–380 are repeated.

If, at step 380, central system 100 determines that the sub-interval duration has elapsed, then at step 390, central system 100 determines whether all sub-intervals, herein, all ten sub-intervals, have run. If not, central system 100 returns to step 350, increments the sub-interval, resets the sub-interval timer and repeats steps 360–380 as generally described above.

After central system 100 increments the registration index at step 340 and broadcasts the incremented registration index "10" at step 360, mobile terminal 10 will find that the broadcast registration index "10" does not match its stored registration index "01" at step 425 of FIG. 4. Consequently, mobile terminal 10 knows that its temporary identifier "5568" is invalid.

At step 430, mobile terminal 10 checks whether the most recently broadcast mode flag is set. It will be recalled that at step 360, the mode flag was broadcast by central system 100 as being set. Because the broadcast mode flag is set, mobile terminal 10 knows that a disaster recovery is in progress. Use of the mode flag allows suspension of the normal registration procedure for the community of mobile terminals served by the central system.

At step 435 of FIG. 4, mobile terminal 10 captures the broadcast interval. At the first execution of step 360 of FIG. 3, the interval has a value of "0". At step 440 of FIG. 4, mobile terminal 10 compares the broadcast interval "0" to the least significant digit of its invalid temporary identifier "8". Since the former value "0" is less than the latter value "8", mobile terminal 10 effectively knows that it is not yet permitted to try to obtain a valid temporary identifier. Mobile terminal 10 repeats steps 435 and 440.

As shown in FIG. 5A, central system 100 eventually executes step 360 resulting in broadcast of system control message 561 including registration index 510B with a value of "10" (base 2), mode flag 515B with a value of "1" (base 2), that is, the mode flag is set, sub-interval flag 520B with a value of "1" (base 2) and sub-interval designator 525B with a value of "5" (base 10).

For convenience, the sub-interval flag is transmitted in a system control message. When the sub-interval is unset, or has a value of "0" as shown in field 520A of system control message 551, it indicates that a sub-interval designator is not transmitted. In contrast, when the sub-interval flag is set, or has a value of "1" as shown in field 520B of system control message 561, it indicates that a sub-interval designator is also transmitted, such as sub-interval designator 525B.

The sub-interval flag is described as having a length of one bit, which is consistent with the sub-interval designator having a predetermined length. Alternatively, if the length in bits of the sub-interval is determined dynamically, the sub-interval length in bits must also be broadcast. That is, the granularity of a sub-interval can be predetermined or determined dynamically as a function of, for example, the number of mobile terminals in the routing table before the routing table was lost. Dynamic determination of the length of a sub-interval increases the efficiency and complexity of the recovery mechanism.

Figure 5B:
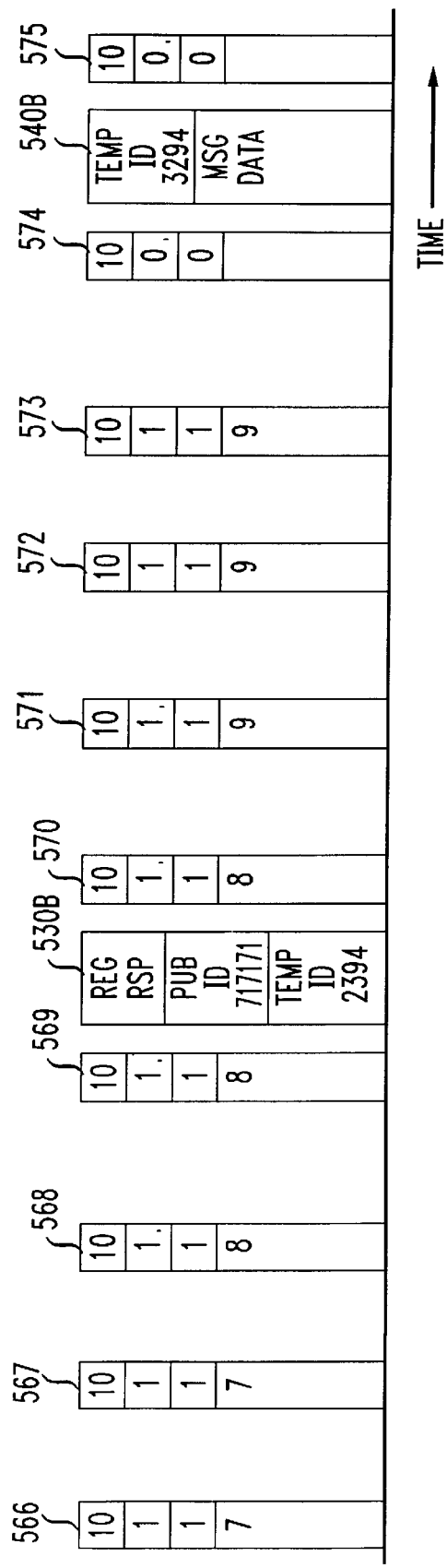

By the aforementioned process, central system 100 also generates and broadcasts system control messages 562–573, shown in FIGS. 5A–5B. Upon subsequent executions of steps 435–440, mobile terminal 10 captures system control messages 562–567, and determines that it should not attempt registration yet.

Figure 6B:
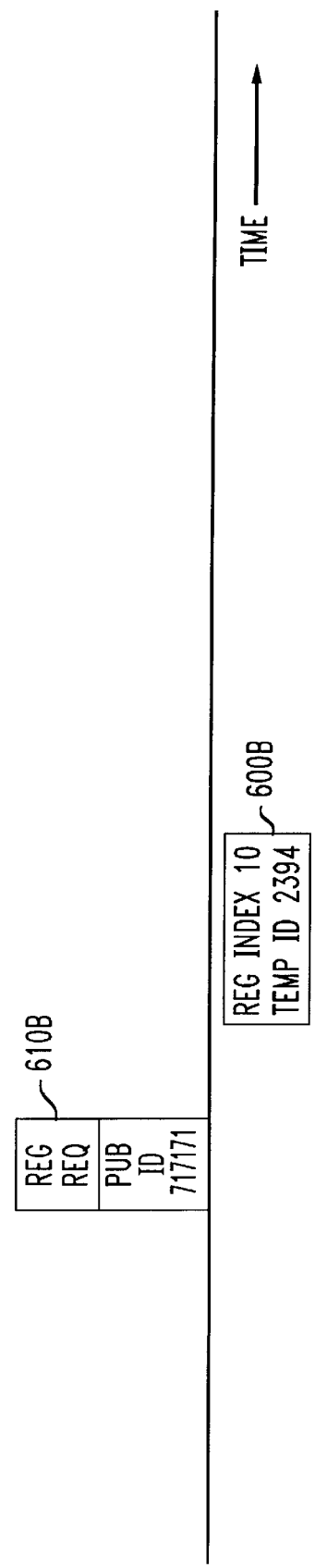

Eventually, at an execution of step 435, mobile terminal 10 captures broadcast system control message 568, shown in FIG. 6B, having an interval value of "8". At step 440, mobile terminal 10 finds that the broadcast sub-interval "8" is equal to the least significant digit of its invalid temporary identifier "8", so mobile terminal 10 proceeds to step 450 and registers. During the registration of step 450, mobile terminal 10 sends registration request 610B, shown in FIG. 6B, to central system 100 via upstream channel 6. Central system 100 replies to the registration request 610B by sending registration response 530B, shown in FIG. 5B, including temporary identifier "2394" to mobile terminal 10 via downstream channel 5.

At step 455 of FIG. 4, mobile terminal 10 stores the new temporary identifier "2394" and the registration index "10" at the time of receipt of the temporary identifier. Box 600B in FIG. 6B indicates a portion of the storage of the mobile terminal 10 after step 455 of FIG. 4.

At step 460, mobile terminal 10 captures the broadcast mode flag in system control message 570 of FIG. 5B. At step 465, mobile terminal 10 determines that the mode flag is set, meaning that a disaster recovery is still in progress and so mobile terminal 10 should not attempt to send packets of message data. Mobile terminal 10 repeats steps 460–465 for system control messages 571–573.

At some time after broadcasting system control message 573 of FIG. 5B, central system 100 executes step 390 of FIG. 4, and determines that all sub-intervals have elapsed, i.e., that the post-disaster registration process has ended. At this point, central system 100 has a valid routing table for the mobile terminals in communication therewith. So, central system 100 returns to normal operation at step 310. Upon the next execution of step 320, central system 100 broadcasts system control message 574 of FIG. 5B. If a message for mobile terminal 10 arrives from external system 160, central system 100 places the message into message data packet 540B, seen to have the new temporary identifier "2394" for mobile terminal 10, and transmits the message data packet 540B on downstream channel 5. Upon the following execution of step 320, central system 100 broadcasts system control message 575.

Immediately after system control message 573 is broadcast, at the execution of steps 460–465, mobile terminal 10 determines that the mode flag is no longer set, and returns to normal operation at step 415. During normal operation, mobile terminal 10 captures and processes message data packet 540B in a conventional manner.

As a further example illustrating operation of the inventive technique, let it be assumed that after capturing and processing system control message 555 in FIG. 5A, mobile terminal 10 went into a power standby mode, or for some other reason stopped monitoring downstream channel 5 for a while. Assume further that the mobile terminal 10 then woke up, or resumed listening to downstream channel 5, and, at an execution of step 420, captured broadcast system control message 575. Upon the next execution of step 425, mobile terminal 10 determines that the broadcast registration index "10" captured from message 575 does not match its stored registration index "01" (shown in box 600A of FIG. 6A). At step 430, mobile terminal 10 determines that the mode flag in message 575 was not set, so mobile terminal 10 effectively knows that a disaster recovery is not in progress. Mobile terminal 10 then proceeds to step 405 to obtain a new temporary identifier.

An advantage of the above-described scheme is that a mobile terminal can determine whether its temporary identifier is valid, and so will refrain from needless registration even if there is a problem.

Another advantage of the above-described scheme is that only a subset of mobile terminals attempts to register at any time after a disaster, thereby avoiding crippling congestion on the upstream channel.

A further advantage of the above-described scheme is that the duration of the disaster recovery registration period is substantially known in advance.

Yet another advantage of the above-described scheme is that co-ordination between individual mobile terminals is not required.

Still another advantage of the above-described scheme is that the actual registration process for a specific mobile terminal after a disaster is the same as during normal operation, which avoids an increase in the complexity of the mobile terminal and central system.

New mobile terminals which enter the area served by the central system while a disaster recovery is in progress are allowed to immediately join in the registration process, that is, consider themselves to be as yet unregistered mobile terminals from a previous sub-interval. The result is that a new mobile terminal quickly obtains a registration number, then enters a power standby mode until disaster recovery is complete, which saves battery power in the mobile terminal. Typically, when a communications system provides for a standby power mode for its mobile terminals, there is a regularly broadcast system control message which "wakes up" mobile terminals having pending messages.

In a modification, new mobile terminals must wait until the disaster recovery is complete before registering. A drawback of this scheme is that when disaster recovery is complete, which may be indicated by a broadcast from the central system which is globally addressed to all mobile terminals, the group of new mobile terminals all attempt registration at approximately the same time, which may congest the communication channel.

Alternatively, a new mobile terminal selects a random number or other prestored number, and uses the selected number in lieu of an invalid temporary identifier. This promotes statistical spreading of new mobile terminals, but does not have the power saving advantage of maximizing time in standby mode.

In another embodiment, the profiles associated with certain mobile terminals are designated for priority services.

After a disaster, as soon as such mobile terminals are registered, the central system will transmit message data packets between external systems and such mobile terminals, while the non-priority mobile terminals are continuing with post disaster registration. This is useful for essential services such as ambulances, emergency crews and so on.

In a modification, for priority mobile terminals, the central system assigns temporary identifiers having their n least significant bits equal to a predetermined value, and this predetermined value is the first group permitted to register during the first sub-interval after a disaster. This embodiment ensures that priority mobile terminals have the shortest service interruption. For example, the central system reserves temporary identifiers ending in "00" for priority mobile terminals. During a normal registration, the central system does not assign temporary identifiers ending in "00"; after accessing the profile of a newly registered mobile terminal and determining it has priority status, the central system sends a revised temporary identifier ending in "00" to the priority mobile terminal.

The above described embodiments are concerned with a configuration having one central system serving a community of mobile terminals. It will be readily appreciated that the central system may correspond to one radio cell in a cellular system, and that the above-described disaster recovery registration scheme facilitates orderly registration of subsets of the mobile terminals in a cell without any knowledge of which mobile terminals are in the cell. Since the identities of the mobile terminals in a cell at any time are unpredictable, it is important that the disaster recovery registration protocol function without such identities, and without reliance on control messages addressed to identified mobile terminals.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of controlling registration attempt by a terminal using a contention protocol to communicate with a central system, the method comprising:
    transmitting a registration index from the central system to the terminal at specified temporal periods; and
    modifying the value of the registration index when the terminal should attempt to register with the central system, wherein modifying the value of the registration index comprises modifying when a routing table included in the central system becomes unusable.

2. The method of claim 1, wherein the registration index is modified after a failure at the central system, and wherein the registration index allows a sequence of system failures to be respectively distinguished.

3. The method of claim 2, wherein the registration index has a length of at least two bits.

4. The method of claim 1, wherein the terminal obtains an identifier during registration and stores the identifier and the value of the registration index at the time the identifier was obtained.

5. The method of claim 4, wherein the terminal compares the value of the stored registration index and the value of the transmitted registration index, and determines that it should attempt to register with the central system when the stored and transmitted values of the registration index do not match.

6. The method of claim 4, wherein the terminal compares the value of the stored registration index and the value of the transmitted registration index, and determines that it should refrain from attempting to register with the central system when the stored and transmitted values of the registration index match.

7. The method of claim 1, further comprising:
    transmitting a mode flag from the central system to the terminal at predetermined temporal intervals; and
    modifying the value of the mode flag when the central system is recovering from a disaster so that the terminal refrains from immediately attempting to register with the central system.

8. The method of claim 7, wherein when the terminal determines that the registration index has been modified and the mode flag has not been modified, the terminal immediately attempts to register.

9. The method of claim 7, wherein when the terminal determines that the registration index has been modified and the mode flag has been modified, the terminal refrains from immediately attempting to register.

10. The method of claim 7, wherein the terminal is able to associate itself with one of a plurality of sub-intervals, and further comprising:
    transmitting a sub-interval designator from the central system to the terminal at specified temporal intervals when the central system is recovering from a disaster, and
    modifying the value of the sub-interval designator after a predetermined number of the specified temporal intervals.

11. The method of claim 10, wherein the terminal has a stored value, the terminal compares the stored value with the transmitted sub-interval designator, and the terminal determines it should associate itself with a sub-interval on the basis of the comparison.

12. The method of claim 11, wherein the sub-interval designator designates a specified number of least significant bits of the stored value.

13. The method of claim 11, wherein the stored value is an identifier obtained during registration.

14. A method of controlling a terminal communicating with a central system using a contention protocol when a central system is recovering from a disaster and wherein the terminal may relate to a sub-interval, the method comprising:
    transmitting a mode flag from the central system to the terminal at regular temporal periods;
    modifying the value of the mode flag when the central system is recovering from a disaster;
    transmitting a sub-interval designator from the central system to the terminal at specified temporal intervals when the central system is recovering from a disaster, and
    modifying the value of the sub-interval designator after a predetermined number of the specified temporal intervals.

15. The method of claim 14, wherein the central system suspends transmission of message data packets from an external system to the terminal when the central system is recovering from a disaster.

16. The method of claim 14, wherein the terminal suspends transmission of message data packets for an external system to the central system when the central system is recovering from a disaster.

17. The method of claim 14, wherein the terminal has a stored value, the terminal compares the stored value with the transmitted sub-interval designator, and the terminal determines it should associate itself with a sub-interval on the basis of the comparison.

18. The method of claim 17, wherein the sub-interval designator designates a specified number of least significant bits of the stored value.

19. The method of claim 17, wherein the stored value is an identifier obtained during registration.

20. A method of associating a terminal with one of a plurality of sub-intervals, the terminal using a contention protocol to communicate with a central system, the method comprising:

transmitting a sub-interval designator from the central system to the terminal at regular temporal periods, wherein the terminal has a stored value, wherein the terminal compares the stored value with the transmitted sub-interval designator, and wherein the terminal determines it should associate itself with a sub-interval on the basis of the comparison, and modifying the value of the sub-interval designator after a number of the regular temporal periods.

21. The method of claim 20, wherein the sub-interval designator designates a specified number of least significant bits of the stored value.

22. The method of claim 20, wherein the stored value is an identifier obtained during registration.

23. A method of associating a terminal with one of a plurality of sub-intervals, the terminal using a contention protocol to communicate with a central system, the method comprising:

transmitting a sub-interval designator from the central system to the terminal at regular temporal periods, wherein the number of the regular temporal periods is predetermined; and modifying the value of the sub-interval designator after a number of the regular temporal periods.

24. A method of associating a terminal with one of a plurality of sub-intervals, the terminal using a contention protocol to communicate with a central system, the method comprising:

transmitting a sub-interval designator from the central system to the terminal at regular temporal periods; and modifying the value of the sub-interval designator after a number of the regular temporal periods, wherein the number of the regular temporal period is dynamically determined.

25. A method of associating a terminal with one of a plurality of sub-intervals, the terminal using a contention protocol to communicate with a central system, the method comprising:

transmitting a sub-interval designator from the central system to the terminal at regular temporal periods; and modifying the value of the sub-interval designator after a number of the regular temporal periods, wherein the number of the regular temporal periods depends on characteristics of the contention protocol.

26. A method of associating a terminal with one of a plurality of sub-intervals, the terminal using a contention protocol to communicate with a central system, the method comprising:

transmitting a sub-interval designator from the central system to the terminal at regular temporal periods; and modifying the value of the sub-interval designator after a number of the regular temporal periods, wherein a plurality of terminals are served by the central system, and the number of the regular temporal periods depends on the number of terminals served by the central system.

27. A method of associating a terminal with one of a plurality of sub-intervals, the terminal using a contention protocol to communicate with a central system, the method comprising:

transmitting a sub-interval designator from the central system to the terminal at regular temporal periods; and modifying the value of the sub-interval designator after a number of the regular temporal periods, wherein the number of sub-intervals depends on characteristics of the contention protocol.

28. A method of associating a terminal with one of a plurality of sub-intervals, the terminal using a contention protocol to communicate with a central system, the method comprising:

transmitting a sub-interval designator from the central system to the terminal at regular temporal periods; and modifying the value of the sub-interval designator after a number of the regular temporal periods, wherein a plurality of terminals are served by the central system, and the number of sub-intervals depends on the number of terminals served by the central system.

29. A method for controlling a registration attempt by a terminal using a contention protocol to communicate with a central system, the method comprising:

modifying a value of a registration index when the terminal should attempt to register with the central system; and registering the terminal with the central system in response to the modified value of the registration index, wherein the terminal remaining within an area served by the central system does not re-register with the central system unless a system failure has occurred at the central system.

* * * * *